(12) United States Patent
Olguin

(10) Patent No.: US 9,066,506 B2
(45) Date of Patent: Jun. 30, 2015

(54) TANGLE FREE TIP TOP FOR FISHING

(71) Applicant: Dee Thomas Fishing LLC, Palo Alto, CA (US)

(72) Inventor: Grant Olguin, Palo Alto, CA (US)

(73) Assignee: Dee Thomas Fishing LLC, Palo Alto, CA (US)

( * ) Notice: Subject to any disclaimer, the term of this patent is extended or adjusted under 35 U.S.C. 154(b) by 460 days.

(21) Appl. No.: 13/631,613

(22) Filed: Sep. 28, 2012

(65) Prior Publication Data

US 2013/0167426 A1 Jul. 4, 2013

Related U.S. Application Data

(63) Continuation-in-part of application No. 29/409,757, filed on Dec. 28, 2011, now Pat. No. Des. 677,751.

(51) Int. Cl.
*A01K 87/04* (2006.01)

(52) U.S. Cl.
CPC ...................................... *A01K 87/04* (2013.01)

(58) Field of Classification Search
USPC .......................................... 43/24, 18.1 R, 25
See application file for complete search history.

(56) References Cited

U.S. PATENT DOCUMENTS

| | | | | |
|---|---|---|---|---|
| 2,702,959 A | * | 3/1955 | Wiglesworth | 43/24 |
| 3,060,618 A | * | 10/1962 | Grishkin | 43/24 |
| 3,927,488 A | * | 12/1975 | Peddy | 43/25 |
| 5,361,529 A | * | 11/1994 | Lindler | 43/24 |
| D374,910 S | * | 10/1996 | Phethean | D22/143 |
| 6,802,151 B1 | * | 10/2004 | Jochum | 43/24 |
| 7,533,484 B2 | * | 5/2009 | Markley et al. | 43/18.1 HR |
| D668,317 S | * | 10/2012 | Thomas | D22/143 |
| 8,365,458 B2 | * | 2/2013 | Omura | 43/24 |
| 8,615,919 B2 | * | 12/2013 | Lindgren | 43/18.1 CT |
| 2008/0005953 A1 | * | 1/2008 | Anderson | 43/24 |

\* cited by examiner

*Primary Examiner* — Christopher P Ellis
(74) *Attorney, Agent, or Firm* — Richard T. Ogawa; Ogawa P.C.

(57) ABSTRACT

In a specific example, the present invention provides a fishing rod apparatus configured with low profile guides and a tip top, which are prone to fewer or almost no line tangles.

20 Claims, 14 Drawing Sheets

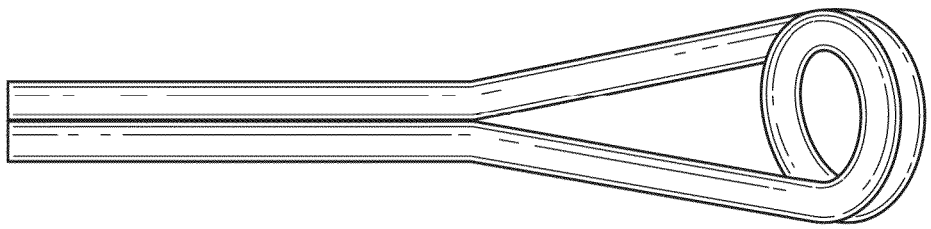
FIG. 13
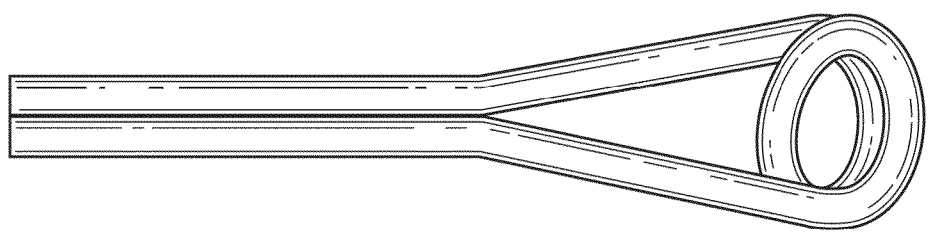
FIG. 14
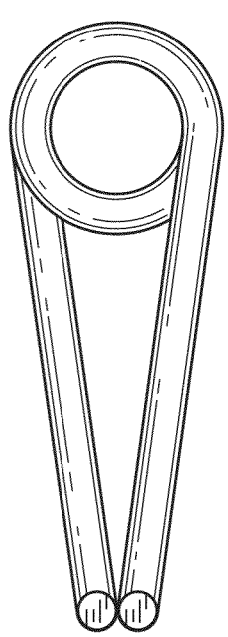   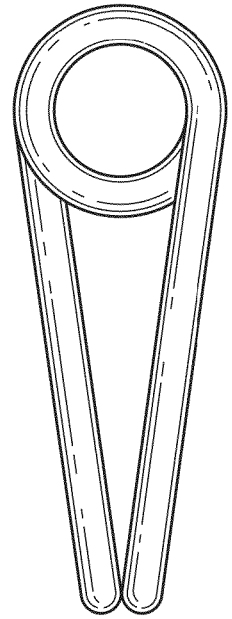
FIG. 15    FIG. 16

TANGLE FREE TIP TOP FOR FISHING

CROSS-REFERENCE TO RELATED APPLICATIONS

This application is a continuation in part and claims priority to U.S. Ser. No. 29/409,757 filed Dec. 28, 2011, which is commonly assigned, and hereby incorporated by reference herein.

BACKGROUND OF INVENTION

The popularity of fishing has increased through the years. One common technique of fishing is called "still fishing." Still fishing often includes use of live bait, such as a worm, night crawler, grub, minnow, crawfish, or others. Still fishing can successful catch fish such as smaller fresh water pan fish including blue gill, crappie, and perch using a small red worm or a larger night crawler, or alternative larger predator fish such as a black, brown, spotted, or striper bass, trout, or other game fish using the same or larger live or even dead baits. As an example, the worm or crawler is commonly attached to a small barbed hook, which is attached to a light line on a fishing pole. The fishing pole is often light and coupled to an open face spinning reel spooled with the light line. The pole and reel was used to cast the worm into a body of water, such as a lake, stream, river, or pond, which hopefully had some fishing to be caught. The terms "still fishing' literally describe the fisherman's technique of waiting for the fish to strike the worm or other live bait. Although highly successful, other techniques have also been developed.

Artificial lures have been developed to entice a fish to strike using various casting and spinning techniques. Artificial lures include spoons and spinners, minnow like plugs and crank baits, spinner baits and chatter baits, jigs and soft plastics, including worms, creatures, and crawdads, and most recently swim baits from the Golden State of California. Each of these baits is designed to imitate a bait such as a worm, injured minnow, or others. Often times, a fishing angle would make countless casts using high precision casting and/or spinning reels configured on high quality graphite fishing rods.

As the popularity of fishing increased, organized groups such as the Bass Angler's Sportsman Society, commonly called "BASS," promoted major bass fishing tournaments. Such tournaments hosted the world's best bass anglers in popular lakes and rivers throughout the country. Such anglers' used advanced reels, rods, and lures in an attempt to catch the heaviest stringer of the prized bass-often large mouth bass or black bass. Advanced fishing techniques also were developed to catch these black bass.

SUMMARY OF THE INVENTION

According to the present invention, fishing techniques are included. More particularly, the present invention provides a fishing rod, including guides, and related casting technique for catching predator fish and the like. Merely by way of example, the present rod device and method can be applied to the field of bass fishing, but it would be recognized that other types of fishing such as salt water, other fresh water, and fishing species that can live in slightly salt water or fresh water environments. The types and varieties of fish can range from black bass, peacock bass, small mouth bass, spotted bass, salmon (e.g., King or Chinook, Silver or Coho, Pink, Chum or Dog, Sockeye) and trout, striper bass, large sunfish (e.g., Red Ear, Blue Gill), crappie, catfish (e.g., Black Bullhead, Brown Bullhead, Channel, Flathead), muskie and pike, and walleye, and other fresh water species listed herein and outside of this specification, as well as salt water species, including cods (e.g., rock, lingcod, china, gopher, vermillion, red, black, yellow), tuna (e.g., albacore, yellow fin, blue fin, black fin) and mackerel, halibut (e.g., Pacific, Calif.), shark, salmon, bass (e.g., calico, black, blue, yellow), grouper, yellowtail, wahoo, commonly called "Ono," mahi-mahi or dorado or dolphin, marlin, tarpon, sailfish, shark, and others.

In a specific example, the present invention provides a fishing rod apparatus configured with low profile guides, which are prone to fewer or almost no line tangles. Further details of the present fishing rod apparatus are found throughout the present specification and more particularly below.

In an example, the present invention provides a fishing rod configured with a snag free tip-top. The fishing rod comprises a tubular member comprising a tip end and a butt end. The tubular member is often made of carbon graphite, fiberglass, or other composites. The rod includes a sleeve device comprising a first opening configured to the tip end of the tubular member, and a second opening comprising a first recessed region and a second recessed region. A first wire end is configured within the first recessed region, and a second wire end is configured within the second recessed region. The rod has a loop portion configured between the first wire end and the second wire end. A first weld material is to configure the first wire end within the first recessed region and a second weld material is to configure the second wire end within the second recessed region. The rod has a tip top configured from the loop portion, the first wire end, the second wire end, and the sleeve device to be substantially ridged and mechanically attached within the first recessed region and second recessed region. In an example, a substantial portion of the outer surface region of the tip top including the loop portion, the first wire end, and the second wire end are free from any weld material including the first weld material and the second weld material.

One or more benefits may be achieved using one or more of the specific embodiments. As an example, the present device and method provides for an improved fishing technique with improved efficiencies. In other embodiments, the present method and resulting structure are easy to implement using conventional hardware and materials. In a preferred embodiment, the present method and device that allows for casting braided line in a substantially tangle free manner, while providing precision and accuracy while casting. Depending upon the embodiment, one or more of these benefits can be achieved. These and other benefits are further described throughout the present specification and more particularly below.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

FIGS. 11, 12, 13, 14, 15 and 16 are respectively first side-view, second side-view, face-view, back-view, a first center-view, and a second center view of the fishing rod guide of FIG. 9.

DETAILED DESCRIPTION OF SPECIFIC EMBODIMENTS OF THE INVENTION

Figure 1:
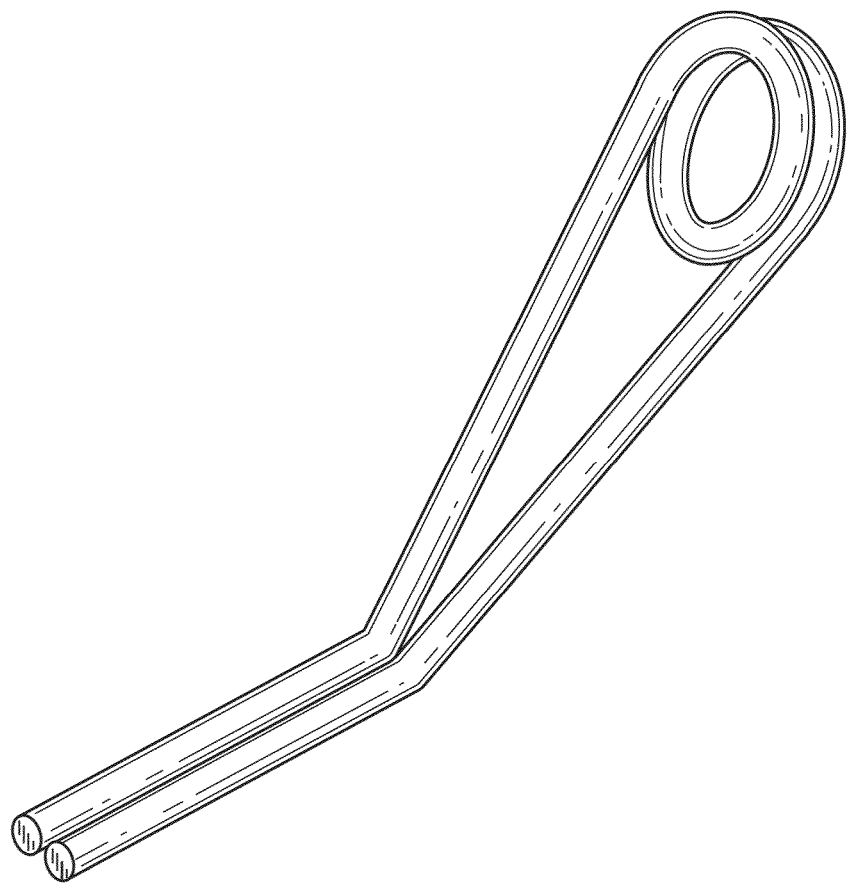
FIG. 1 is a perspective view of a fishing rod guide showing an embodiment of my new design.

At one time, fishing techniques relied upon monofilament line as a means for casting the lure. Monofilament line is characterized by a homogeneous, continuous, strand of polymeric material that was packed on a spool of a reel. Unfortunately, monofilament line was prone to breakage, stretch, and wear and tear upon conventional use, especially when fishing through rocks, grass, and brush. To overcome some of the limitations with monofilament line, advanced braided line has replaced the use of monofilament line in some fishing techniques. Braided line is often much smaller in diameter than conventional monofilament, has good casting characteristics, and more durable. Braided line generally does not stretch, which provides extreme sensitivity when fishing almost any kind of lures. Fishing gear manufacturers have produced Fireline™ or Spider Wire™ braided line by Berkeley, which is owned by Pure Fishing, Inc. or others. Examples of such lines include braided lines made from "gel-spun polyethylene fibers, which is the same material that is used in the making of bulletproof vests." "Designed to resist stretching, the braided lines also have more strength at various diameters than do other fishing lines, such as monofilament." "As a result, braid is most frequently used during situations in which anglers need low-stretch, strong line. http://www.ehow.com/how_5114680_use-spiderwire.html#ixzz1hgilnKRN.

Although highly successful, braided line has limitations. As an example, braided line is often difficult to untangle once it becomes tangled. Braided line is often very ply-able and can become knotted with it-self or other objects. Braided line often becomes tangled around one or more of the fishing guides that are attached to the length of the rod. Once the braided line becomes tangled, it is often difficult to untangle, leading to lost fishing time, which is especially valuable in major fishing tournaments such as BASS or when the bite is hot. These and other limitations are further described throughout the present specification and more particularly below.

According to the present invention, fishing techniques are included. More particularly, the present invention provides a fishing rod, including guides, and related casting technique for catching predator fish and the like. Merely by way of example, the present rod device and method can be applied to the field of bass fishing, but it would be recognized that other types of fishing such as salt water, other fresh water, and fishing species that can live in slightly salt water or fresh water environments. The types and varieties of fish can range from black bass, peacock bass, small mouth bass, spotted bass, salmon (e.g., King or Chinook, Silver or Coho, Pink, Chum or Dog, Sockeye) and trout, striper bass, large sunfish (e.g., Red Ear, Blue Gill), crappie, catfish (e.g., Black Bullhead, Brown Bullhead, Channel, Flathead), muskie and pike, and walleye, and other fresh water species listed herein and outside of this specification, as well as salt water species, including cods (e.g., rock, lingcod, china, gopher, vermillion, red, black, yellow), tuna (e.g., albacore, yellow fin, blue fin, black fin) and mackerel, halibut (e.g., Pacific, Calif.), shark, salmon, bass (e.g., calico, black, blue, yellow), grouper, yellowtail, wahoo, commonly called "Ono," mahi-mahi or dorado or dolphin, marlin, tarpon, sailfish, shark, and others.

In an example, the present invention provides a snag free tip-top device and method. The device includes a tip top mechanically fit and secured with the tip end of the tubular member or fishing rod blank. The device has a sleeve device comprising a first opening formed on an end of the sleeve device, and a second opening comprising a first recessed region and a second recessed region formed on the other end of the sleeve device. As an example, the sleeve device is made of a solid piece of stainless steel or other suitable material using a high precision machining process to form the first and second openings, as will be shown below. The sleeve device also has an external outer surface region extending from the first opening to the second opening. The external outer surface is preferably smooth and polished to prevent tangling and/or attachment of fishing line. The sleeve device has a tapered portion foamed within a vicinity of the second opening. The tapered portion extends from a first diameter to a second diameter, which is at the vicinity of the second opening.

In an example, the tip top device also has a single strand of solid wire configured with the sleeve device. The single strand of wire comprising a first wire end configured within the first recessed region, a second wire end configured within the second recessed region, and a loop portion configured between the first wire end and the second wire end. The single strand of wire also has a first weld material provided substantially within the first recessed region to configure the first wire end within the first recessed region and a second weld material provided substantially within the second recessed region to configure the second wire end within the second recessed region. A substantial entirety of an outer surface region, including the external outer surface of the sleeve device, the loop portion, and any exposed portions of the first wire end and the second wire end are free from any exposed weld material including the first weld material and the second weld material to prevent the likelihood of fishing line from catching on any outer surface region of the tip top device. Further details of the present method and device can be found throughout the present specification and more specifically below.

FIG. 1 is a perspective view of a fishing rod guide showing an embodiment of my new design. As shown, the fishing guide is a tip-top device for fishing rod. The tip-top includes a sleeve device comprising a first opening, which is configured to the tip end of the tubular member, and a second opening comprising a first recessed region and a second recessed region. As shown is a single strand of wire comprising a first wire end configured within the first recessed region, a second wire end configured within the second recessed region, and a loop portion configured between the first wire end and the second wire end. The tip-top includes a first weld material to configure the first wire end within the first recessed region and a second weld material to configure the second wire end within the second recessed region. A substantial portion of the outer surface region of the tip top including the loop portion, the first wire end, and the second wire end are free from any weld material including the first weld material and the second weld material. The tip-top is substantially ridged and mechanically attached within the first recessed region and second recessed region.

In an example, the loop portion comprises a single loop or a double loop, as shown. As shown, the double loop is configured in a clock-wise manner. The single strand of wire comprises stainless steel. The first weld material and the second weld material comprise stainless steel material. The first weld material is provided by laser irradiation and the second weld material is provided by the laser irradiation. The first end of the sleeve material is to be glued to a tip end of a tubular member of a fishing rod. As shown, the loop portion comprises an open region along a plane of the loop portion. The plane is from about 90 degrees to about 120 degrees from a length of a tubular member to be attached.

Figure 2:
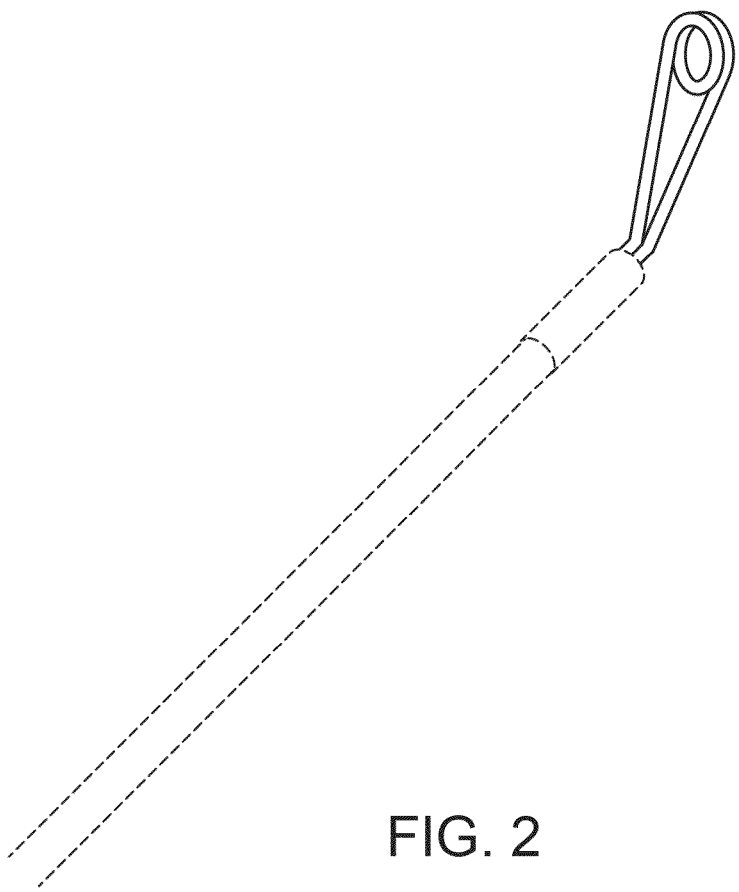
FIG. 2 is a perspective view of a fishing rod guide on a fishing rod as background for the fishing rod guide of FIG. 1.
Figure 3:
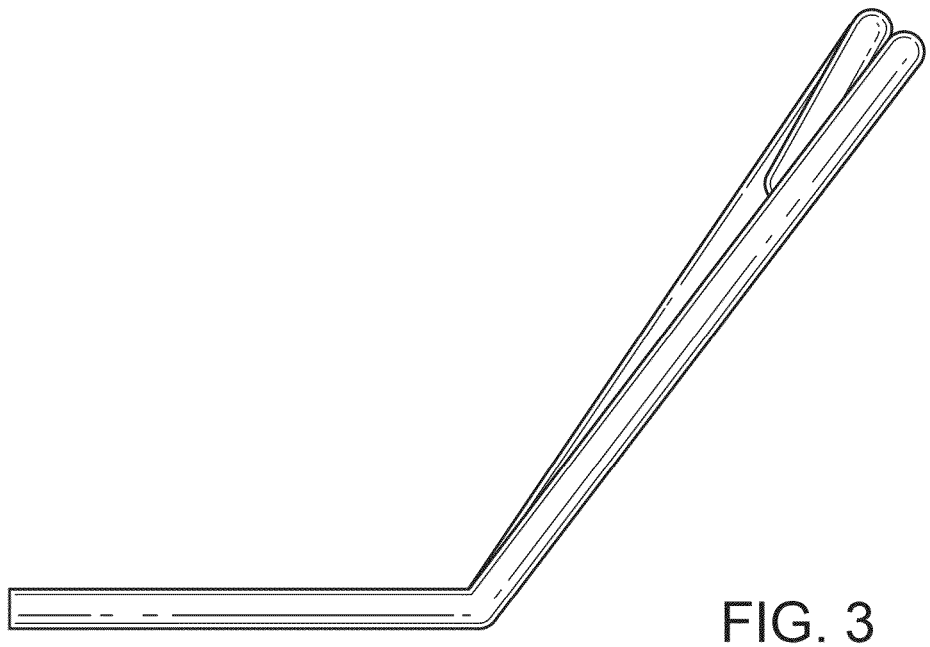
FIGS. 3, 4, 5, 6, 7, and 8 are respectively first side-view, second side-view, face-view, back-view, a first center-view, and a second center view of the fishing rod guide of FIG. 1.
Figure 4:
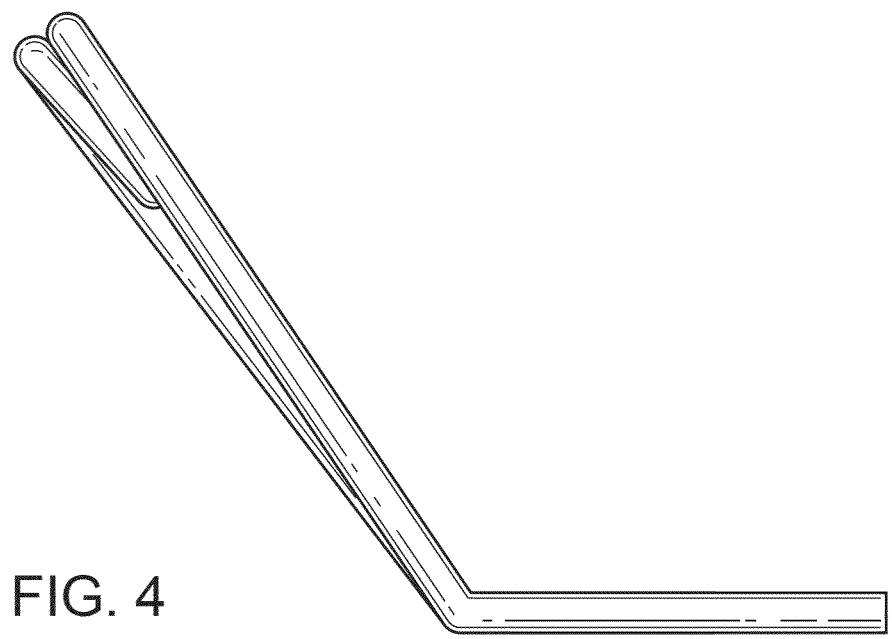
Figure 5:
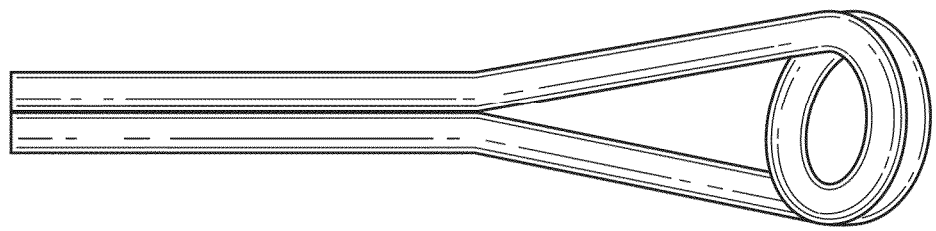
Figure 6:
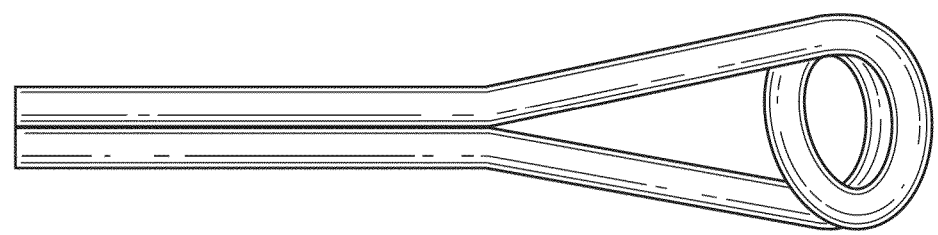
Figures 7, 8:
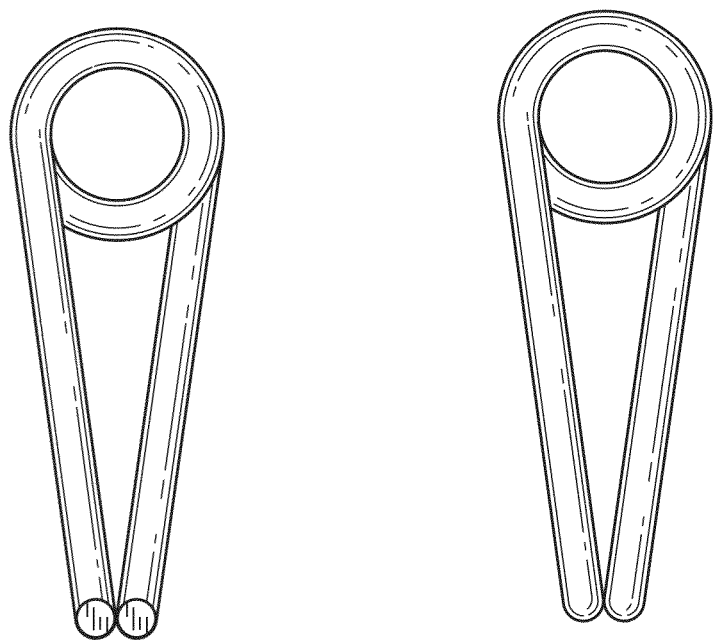

FIG. 2 is a perspective view of a fishing rod guide on a fishing rod as background for the fishing rod guide of FIG. 1. As shown, the tip-top is configured in the sleeve provided on the fishing rod. FIGS. 3, 4, 5, 6, 7, and 8 are respectively first side-view, second side-view, face-view, back-view, a first center-view, and a second center view of the fishing rod guide of FIG. 1.

Figure 9:
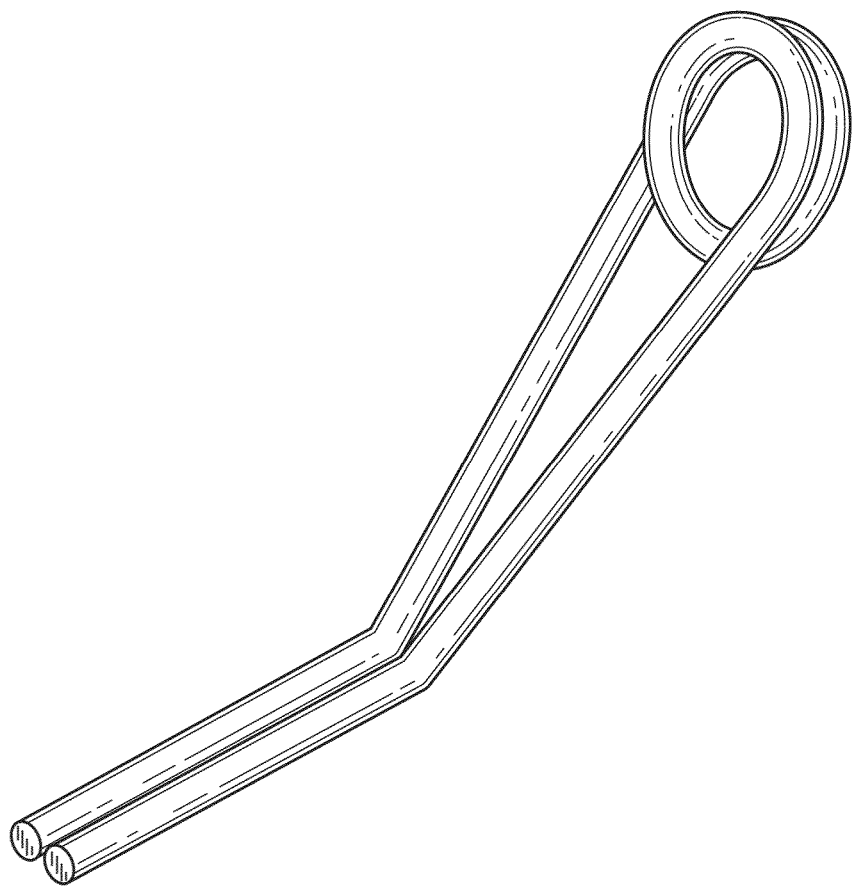
FIG. 9 is a perspective view of a fishing rod guide showing an embodiment of my new design.

FIG. 9 is a perspective view of a fishing rod guide showing an embodiment of my new design. As shown, the fishing guide is a tip-top device for fishing rod. The tip-top includes a sleeve device comprising a first opening, which is configured to the tip end of the tubular member, and a second opening comprising a first recessed region and a second recessed region. As shown is a single strand of wire comprising a first wire end configured within the first recessed region, a second wire end configured within the second recessed region, and a loop portion configured between the first wire end and the second wire end. The tip-top includes a first weld material to configure the first wire end within the first recessed region and a second weld material to configure the second wire end within the second recessed region. A substantial portion of the outer surface region of the tip top including the loop portion, the first wire end, and the second wire end are free from any weld material including the first weld material and the second weld material. The tip-top is substantially ridged and mechanically attached within the first recessed region and second recessed region.

In an example, the loop portion comprises a single loop or a double loop, as shown. As shown, the double loop is configured in a counter-clock-wise manner. The single strand of wire comprises stainless steel. The first weld material and the second weld material comprise stainless steel material. The first weld material is provided by laser irradiation and the second weld material is provided by the laser irradiation. The first end of the sleeve material is to be glued to a tip end of a tubular member of a fishing rod. As shown, the loop portion comprises an open region along a plane of the loop portion. The plane is from about 90 degrees to about 120 degrees from a length of a tubular member to be attached.

Figure 10:
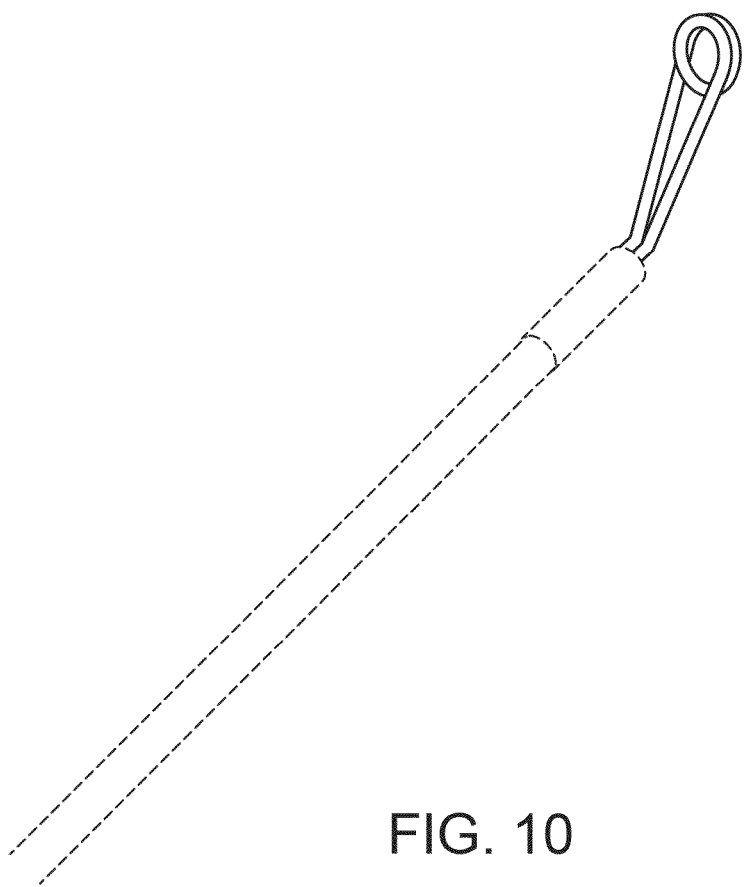
FIG. 10 is a perspective view of a fishing rod guide on a fishing rod as background for the fishing rod guide of FIG. 1.
Figure 11:
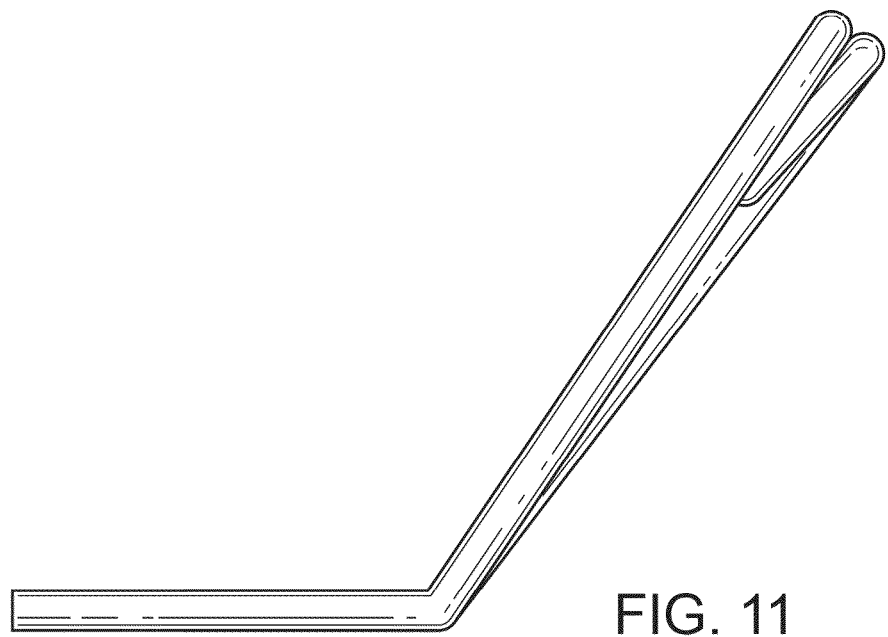
Figure 12:
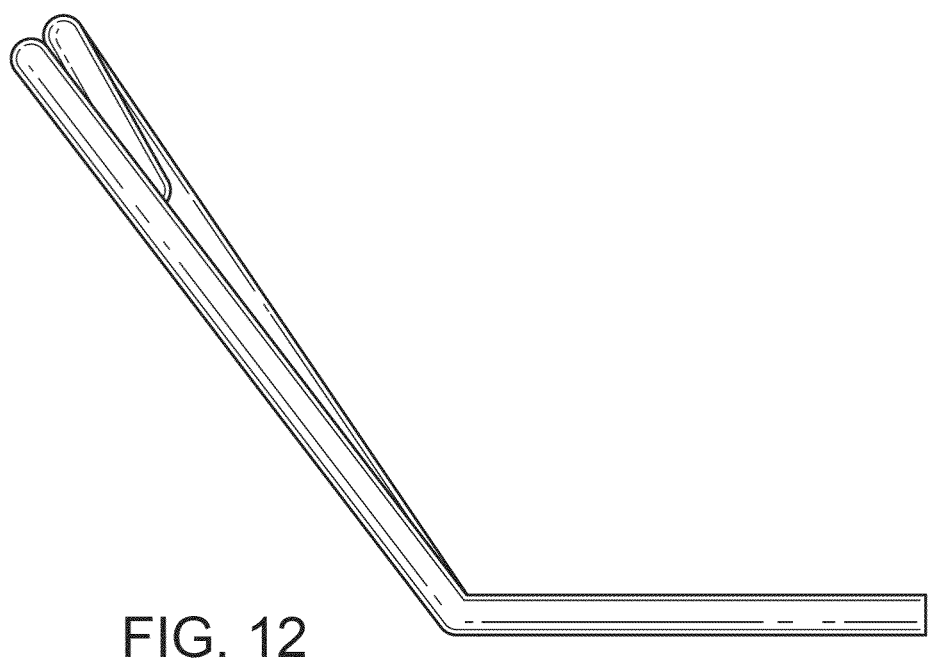

FIG. 10 is a perspective view of a fishing rod guide on a fishing rod as background for the fishing rod guide of FIG. 1. As shown, the tip-top is configured in the sleeve provided on the fishing rod. FIGS. 11, 12, 13, 14, 15 and 16 are respectively first side-view, second side-view, face-view, back-view, a first center-view, and a second center view of the fishing rod guide of FIG. 9.

Figure 17:
FIG. 17 is a photograph of a tip-top including an attachment sleeve device according to an embodiment of the present invention.

FIG. 17 is a photograph of a tip-top including an attachment sleeve device according to an embodiment of the present invention. As shown, the fishing guide is a tip-top device for fishing rod. The tip-top includes a sleeve device comprising a first opening, which is configured to the tip end of the tubular member, and a second opening comprising a first recessed region and a second recessed region. As shown is a single strand of wire comprising a first wire end configured within the first recessed region, a second wire end configured within the second recessed region, and a loop portion configured between the first wire end and the second wire end. The tip-top includes a first weld material to configure the first wire end within the first recessed region and a second weld material to configure the second wire end within the second recessed region. A substantial portion of the outer surface region of the tip top including the loop portion, the first wire end, and the second wire end are free from any weld material including the first weld material and the second weld material. The tip-top is substantially ridged and mechanically attached within the first recessed region and second recessed region.

In an example, the loop portion comprises a single loop or a double loop, as shown. The single strand of wire comprises stainless steel. The first weld material and the second weld material comprise stainless steel material. The first weld material is provided by laser irradiation and the second weld material is provided by the laser irradiation. The first end of the sleeve material is to be glued to a tip end of a tubular member of a fishing rod. As shown, the loop portion comprises an open region along a plane of the loop portion. The plane is from about 90 degrees to about 120 degrees from a length of a tubular member to be attached.

Figure 18:
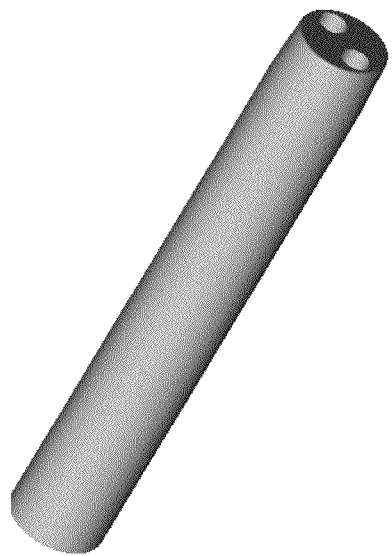
FIG. 18 is a simplified diagram illustrating an attachment sleeve device of FIG. 17.

FIG. 18 is a simplified diagram illustrating an attachment sleeve device of FIG. 17. As shown is a solid sleeve device includes a first opening, which is configured to the tip end of the tubular member, and a second opening comprising a first recessed region and a second recessed region. The first recessed region and the second recessed region are configured to the pair of wires forming the tip top loop, as shown, and previously described. The solid sleeve device is preferably made of high grade stainless steel or other suitable material. The stainless steel is 316 or 304 grade material. As also shown, the sleeve is slightly tapered near the vicinity of the first and second recessed regions. The sleeve is formed from a solid stainless steel material, which is machined using precision cutting tools and the like. The sleeve device can be made of the same, similar, or different material as the tip top loop.

Figure 19:
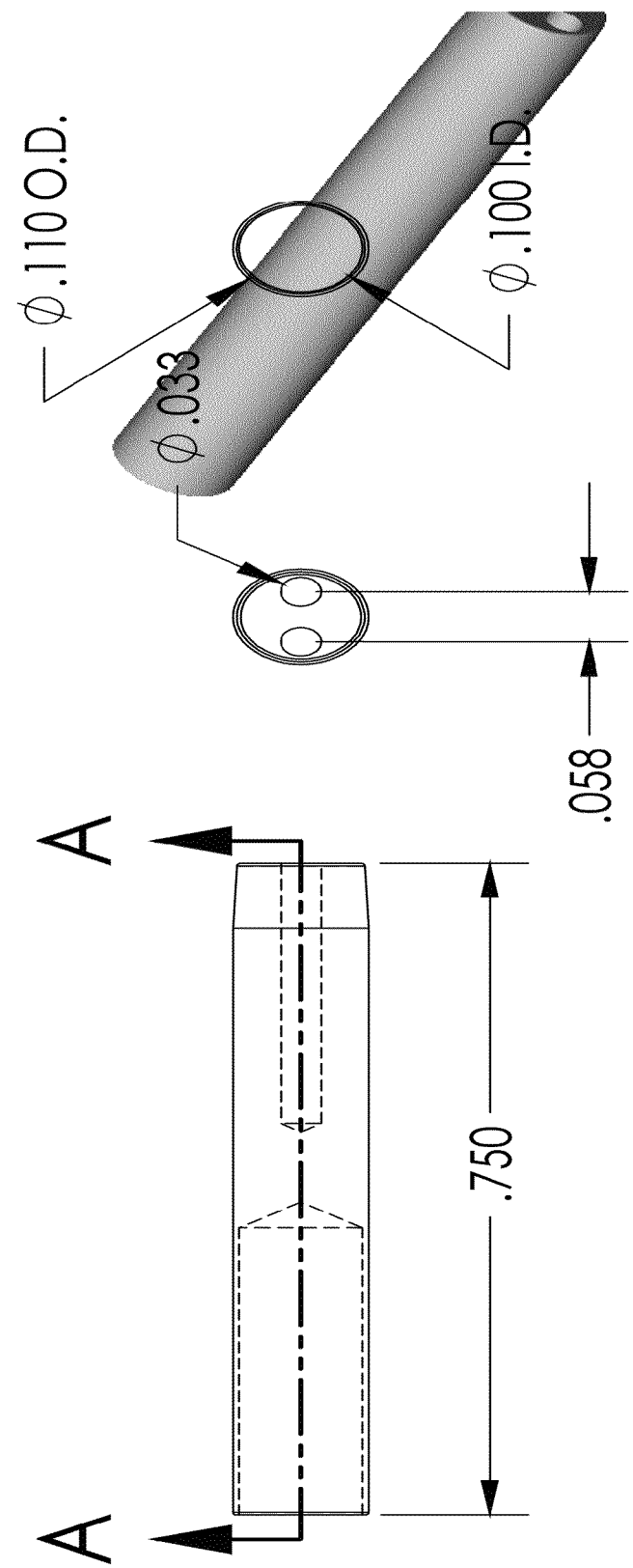
FIG. 19 is a side-view, top-view, and bottom view of an attachment sleeve device of FIG. 18.

FIG. 19 is a side-view, top-view, and bottom view of an attachment sleeve device of FIG. 18. As show is the side-view, top view including two recessed regions, and the bottom view, which includes an opening for the tip of the fishing rod to be inserted into the opening. As shown, the two recessed regions are configured within a vicinity of end, which is tapered. As shown, the taper up to 20 Degrees or greater, and is preferably about 10 Degrees from a normal direction. Further details are shown in the Figure below.

Figure 20:
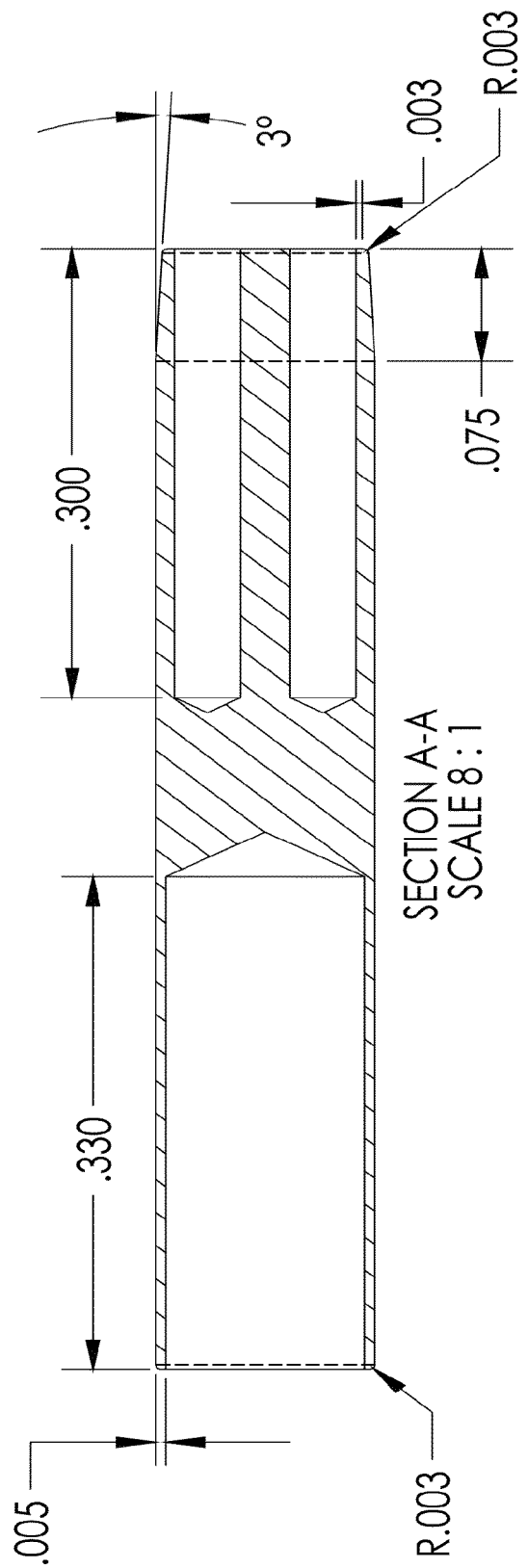
FIG. 20 is a cross-sectional view (A-A) of an attachment sleeve device of FIG. 18.

FIG. 20 is a cross-sectional view (A-A) of an attachment sleeve device of FIG. 18. As shown is the cross-section including the two recessed regions and bottom opening for the rod tip to be inserted. The scale is 8:1 and shows actual dimensions, although there may be variations.

Figure 21:
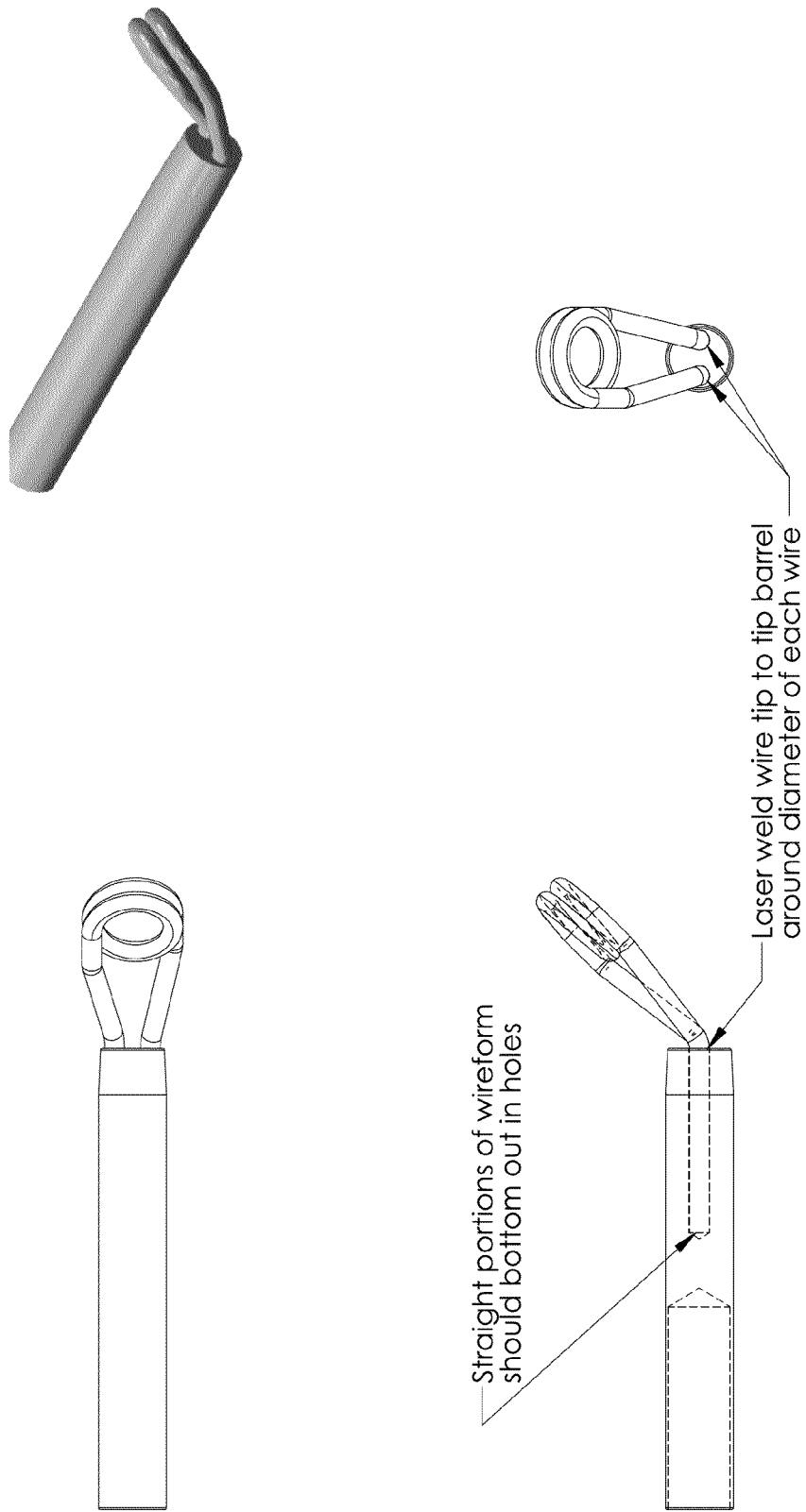
FIG. 21 are simplified diagrams of the assembled tip top device according to an example.

FIG. 21 are simplified diagrams of the assembled tip top device according to an example. As shown is a tip top to be mechanically fit and secured with the tip end of the tubular member, e.g., fishing rod. The tip top includes a sleeve device comprising a first opening, the first opening configured to the tip end of the tubular member and a second opening comprising a first recessed region and a second recessed region. The sleeve has an external outer surface region extending from the first opening to the second opening. The sleeve has a tapered portion formed within a vicinity of the second opening the tapered portion extending from a first diameter to a second diameter, which is at the vicinity of the second opening.

As also shown is a single strand of solid wire configured with the sleeve device. The single strand of wire comprises a first wire end configured within the first recessed region and a second wire end configured within the second recessed region. The solid wire has a loop portion configured between the first wire end and the second wire end. The tip top has a first weld material provided substantially within the first recessed region to configure the first wire end within the first recessed region and a second weld material provided substantially within the second recessed region to configure the second wire end within the second recessed region. As shown, a substantial entirety of an outer surface region, including the external outer surface of the sleeve device, the loop portion, and any exposed portions of the first wire end and the second wire end being free from any exposed weld material including the first weld material and the second weld material.

As also shown, the pair of wires from the solid strand mates with the pair of recessed such that an external interface region is substantially free from a shoulder or a substantial discontinuity, which is likely to be a region to catch and/or tangle a fishing line. That is, the exterior interface region is "hour glass" or "v-shaped" to allow the line to slip over the region without any tangles and/or snagging. Also, the loop diameter is no larger than two times the diameter of the tip of the fishing rod, and preferably less about the same or similar diameter, although it may be slightly larger to keep the line moving through it, while preventing snagging.

Figure 22:
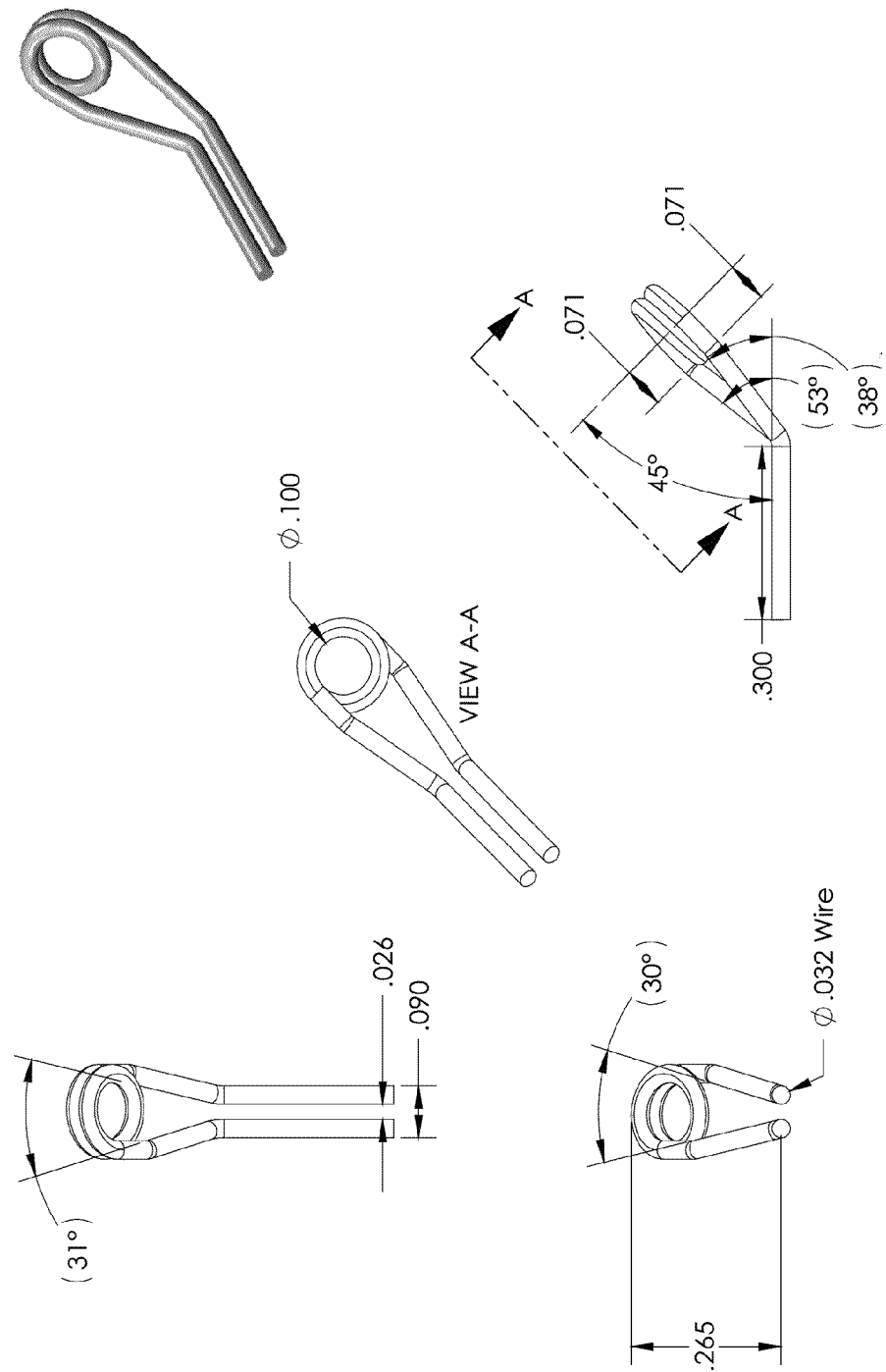
FIG. 22 are simplified diagrams of the solid wire loop device according to an example.

FIG. 22 are simplified diagrams of the solid wire loop device according to an example. As shown in an example, the loop portion comprises a double loop, the sleeve device is configured from a solid stainless steel material machined to form the first opening and the second opening, including the first recessed region and the second recessed region, and the first weld material and the second weld material are provided substantially within the external outer region of the sleeve device such that the first weld material and the second weld material are not contributive of line tangling or snagging of the line onto the first weld material and/or the second weld material. The loop portion from a side view is angled from about 90 degrees to about less than 180 degrees from a normal direction. The loop portion is less than two times in diameter the rod tip diameter and is preferably one times or slightly larger, although it may be smaller in some embodiments. Together and side by side, the pair of wires have a width about equal to a top portion of the sleeve member to prevent any attachment and/or imperfect surface regions for catching and/or tangling line.

A method for fabricating the tip-top has been outlined below.

Provide a sleeve device comprising a first opening to be configured to a tip end of a tubular member of a fishing rod and a second opening comprising a first recessed region and a second recessed region;

Provide a wire structure comprising a first wire end, a second wire end, and a loop portion configured between the first wire end and the second wire end;

Insert the first wire end into the first recessed region;
Insert the second wire end into the second recessed region;
Provide the wire structure configured with the sleeve device;

Irradiate using, for example, an ND/YAG pulsed laser having power of 30 to 70 Watts or 50 Watts), at least one region (having a spot size of 0.003 inches, which may range within a hundredth of an inch) of the sleeve device within a vicinity of the first wire end and the second wire end to cause formation of a first weld material to attach the first wire end within the first recessed region and to cause formation of a second weld material to attach the second wire end within the second recessed region;

Maintain a substantial portion of the outer surface region of the tip top including the loop portion, the first wire end, and the second wire end being free from any weld material including the first weld material and the second weld material;

Provide the tip top being substantially ridged and mechanically attached within the first recessed region and second recessed region; and Perform other steps, as desired.

The above sequence of steps provides a method of fabricating the tip top configured on a fishing rod. As shown, one or more steps may be added, combined, or varied, depending upon the embodiment. That is, the loop portion comprises a single loop or a double loop. The first wire end, the second wire end, and the loop portion are configured from a single strand of wire made of stainless steel. In an example, the single strand of wire is formed using a wire bender or other suitable device. The first weld material and the second weld material comprise stainless steel material. In an example, the loop portion comprises an open region along a plane of the loop portion, the plane being from about 90 degrees to about 120 degrees from a length of a tubular member of a fishing rod to be attached.

In a further example, the present method includes rotating a relative position between a source of the irradiation and the one region of the sleeve. That is, either or both the sleeve or laser beam is rotated to form the one region around a perimeter portion of the sleeve. The perimeter portion of the sleeve irradiated is an entire and continuous circumference of the perimeter portion of the sleeve or a portion of an entire and continuous circumference of the perimeter portion. The irradiation substantially welds each of the wire ends in the structure within each of the recessed regions, while maintaining an outer region free from any welding slag or other surfaces that may lead to tangles or line attachment or damage.

In an example, the loop portion comprises a double loop, the sleeve device is configured from a solid stainless steel material machined to form the first opening and the second opening, including the first recessed region and the second recessed region, and the first weld material and the second weld material are provided substantially within the external outer region of the sleeve device such that the first weld material and the second weld material are not contributive of line tangling or snagging of the line onto the first weld material and/or the second weld material.

In an example, the first weld material and the second weld material comprise stainless steel material. In an example, the method further includes providing a blank sleeve member, which is often a solid piece of steel configured as a rod-like structure, forming the first opening on a first end of the blank sleeve member and forming the first recessed region and the second recessed region of the second opening provided on a second end of the blank sleeve member. The first and second openings can be formed using a precision machining process. The first opening and the second opening are formed within the blank sleeve member such that a blocking region separates the first opening and the second opening; and forming a tapered region within an exterior portion within a vicinity of the second opening; whereupon the tapered region forms a substantially continuous imaginary surface (although it may not be completely continuous) with the pair of wires extending from the first wire end and the second wire end to reduce line catching at an interface between the sleeve device and the pair of wires of the wire structure.

Preferably, the tubular member comprises a tip end and a butt end, the tubular member comprising a plurality of guides spatially disposed from a first portion to a second portion of the tubular member, each of the plurality of guides having a diameter (e.g., outer diameter) being less than a width of a portion of the tubular member at a region of attachment of each of the plurality of guides.

Although the above has been described in specific examples, there can be other variations, modifications, and alternatives. As an example, the guide designs have been manufactured using stainless steel or other suitable materials. Other examples including those described in U.S. Pat. No. 6,612,065, assigned to Ultimate NiTi Technologies, LLC, which is hereby incorporated by reference, can be used. In such examples, fishing rod components are made from shape memory alloy material and, specifically, materials of the Nickel Titanium alloy type. The Nickel Titanium materials may be near stoichiometric intermetallic compounds of nickel and titanium or may include a variety of other elements which may include iron, copper, cobalt, aluminum and the like that will slightly alter the behavior of the material. The alloys have the ability to return to their defined shape or size when compressed or deflected. The shape memory recoverable strain typically is about 6.5-8.5%. The material can be temporarily plastically deformed at a relatively low temperature, and upon exposure to a higher temperature will return to its previously designed pre-deformation shape. The Nickel Titanium alloys typically have a lower specific gravity than the stainless steel heretofore used for guides. For example, a typical Nickel Titanium alloy has a specific gravity of about 6.45 grams per cc, while 304 Stainless Steel typically has a specific gravity of 7.84 grams per cc. Thus, for the volume of material employed, the shape memory material provides a significant weight advantage in that it is at least 15-20% lighter. In its specific application for guides, hook keepers and tops for fishing rods, the Nickel Titanium alloys, due to their strength characteristic and their ability to facilitate repeated bending and rebending without increase in brittleness, facilitate the use of wire having a significantly narrower gauge. For example, stainless steel "snake" guides average about 0.037" in diameter while the Nickel Titanium alloy guide employs wire that is only about 0.020" in diameter, thus magnifying the reduction in weight for each component without sacrificing performance characteristics. In fact, these properties directly translate into a 70% reduction in moment of inertia and rod dampening. As a result, the fishing rod remains crisp and true to its design after the components are mounted thereon. This lighter, finer gauge wire, along with the shape memory and pseudo elastic characteristics of the material, permits the fishing rod to flex more uniformly throughout its entire length. The rod action is significantly enhanced and the tip speed is greatly increased. This results in higher line speed and improved casting distance. Of course, there can be other variations, modifications, and alternatives.

In a specific embodiment, the present invention provides a method of flippin or punching. The method includes traversing a braided fishing line through a fishing guide device. The fishing guide includes a ring structure comprising an upper region and a lower region integrally coupled to each other. The ring structure has a first open region and a second open region. The first open region is in communication with the second open region and is configured to allow a fishing line to pass there through. The guide also includes a first support member extending from a vicinity of the lower region and connecting to a first clock position ranging from about a twelve thirty clock position to about a two o'clock position and a second support member extending from a vicinity of the lower region and connecting to a second clock position ranging from about a ten o'clock position to an eleven thirty clock position. The method includes allowing the braided fishing line to coil fully or partially around an exterior region within a vicinity of lower region of the ring structure and causing the braided fishing line to uncoil from the exterior of the vicinity of the lower region of ring structure by either or both the first support member or the second support member such that the braided fishing line is substantially tangle free from the fishing guide device.

It should be understood that the description recited above is an example of the invention and that modifications and changes to the examples may be undertaken which are within the scope of the claimed invention. As an example, the guides may also be configured with ceramic rings, metal rings, or other insertable structures, Hardloy Rings, Aluminium Oxide, Alconite, Silicon Carbide, Gold Cermet, and others. Also, the wire may be configured from stainless steel, e.g., 304, 316. The wire can be coated with black anodizing material, ceramics, dielectrics, or others. As an example, the fishing rod, and guides can be used for other types of fishing such as salt water, pan-fish, trout, lake, and others, which are not limited to flippin or punching. Additionally, the present specification is related to the following applications, each of which is commonly assigned, and hereby incorporated by reference herein: (1) SNAG-LESS FISHING ROD GUIDE DESIGNS listed as U.S. Serial No. 29/366,085 filed Jul. 19, 2010; (2) FISHING ROD GUIDE listed as U.S. Serial No. 29/355,991 filed on Feb. 18, 2010 and issued as D636,839 on Apr. 26, 2011; (3) ULTRA SNAG-LESS FISHING ROD GUIDE DESIGNS listed as U.S. Serial No. 29/391,381 and filed on May 6, 2011; (4) LOW PROFILE SNAG-LESS FISHING ROD GUIDE DESIGNS listed as U.S. Serial No. 29/408,241 and filed on Dec. 8, 2011; (5) LOW PROFILE SNAG-LESS FISHING ROD TIP TOP GUIDE DESIGNS listed as U.S. Serial No. 29/409,757 and filed on Dec. 28, 2011; (4) U.S. Ser. No. 13/361,849 filed on Jan. 30, 2012.

Therefore, the scope of the appended claims should be accorded the broadest interpretation so as to encompass all such modifications and similar arrangements, including a full scope of equivalents.

The invention claimed is:

1. A fishing rod comprising:
a tubular member comprising a tip end and a butt end, the tubular member comprising a plurality of guides spatially disposed from a first portion to a second portion of the tubular member, each of the plurality of guides having a diameter being less than a width of a portion of the tubular member at a region of attachment of each of the plurality of guides;
a tip top mechanically fit and secured with the tip end of the tubular member, the tip top comprising:
a sleeve device comprising:
a first opening, the first opening configured to the tip end of the tubular member;
a second opening comprising a first recessed region and a second recessed region;
an external outer surface region extending from the first opening to the second opening;
a tapered portion formed within a vicinity of the second opening, the tapered portion extending from a first diameter to a second diameter, the second diameter at the vicinity of the second opening;

a single strand of solid wire configured with the sleeve device, the single strand of wire comprising:
    a first wire end configured within the first recessed region;
    a second wire end configured within the second recessed region;
    a loop portion configured between the first wire end and the second wire end;
    a first weld material provided substantially within the first recessed region to configure the first wire end within the first recessed region;
    a second weld material provided substantially within the second recessed region to configure the second wire end within the second recessed region;
    a substantial entirety of an outer surface region, including the external outer surface of the sleeve device, the loop portion, and any exposed portions of the first wire end and the second wire end being free from any exposed weld material including the first weld material and the second weld material.

2. The rod of claim 1 wherein the loop portion comprises a single loop; wherein the tubular member is made of a fiber glass material or a graphite material.

3. The rod of claim 1 wherein the loop portion comprises a double loop; wherein the sleeve device is configured from a solid stainless steel material machined to form the first opening and the second opening, including the first recessed region and the second recessed region; wherein the first weld material and the second weld material are provided substantially within the external outer region of the sleeve device such that the first weld material and the second weld material are not contributive of line tangling or snagging.

4. The rod of claim 1 wherein the first wire end, the second wire end, and the loop portion configured from a single strand of wire made of stainless steel.

5. The rod of claim 4 wherein the single strand of wire comprises stainless steel.

6. The rod of claim 1 wherein the tip top is configured to be aligned with a plurality of guide devices.

7. The rod of claim 1 wherein the first weld material and the second weld material comprise stainless steel material.

8. The rod of claim 1 wherein the first weld material is provided by laser irradiation using an ND/YAG source; and wherein the second weld material is provided by the laser irradiation; wherein the sleeve device comprises an outer weld region provided around a perimeter of a portion of the sleeve device; the outer weld region being substantially free from the first weld material or the second weld material.

9. The rod of claim 1 wherein the first end of the sleeve material is glued to the tip end of the tubular member.

10. The rod of claim 1 wherein loop portion comprising an open region along a plane of the loop portion, the plane being from about 90 degrees to about 120 degrees from a length of the tubular member.

11. A method of manufacturing a top tip for a fishing rod, the method comprising:
    providing a sleeve device comprising a first opening, the first opening to be configured to a tip end of a tubular member of a fishing rod, and a second opening comprising a first recessed region and a second recessed region;
    providing a wire structure comprising a first wire end, a second wire end, and a loop portion configured between the first wire end and the second wire end;
    inserting the first wire end into the first recessed region;
    inserting the second wire end into the second recessed region;
    irradiating at least one region of the sleeve device within a vicinity of the first wire end and the second wire end to cause formation of a first weld material to attach the first wire end within the first recessed region and to cause formation of a second weld material to attach the second wire end within the second recessed region;
    maintaining a substantial portion of the outer surface region of the tip top including the loop portion, the first wire end, and the second wire end being free from any weld material including the first weld material and the second weld material;
    whereupon the tip top being substantially ridged and mechanically attached within the first recessed region and second recessed region.

12. The method of claim 11 wherein the loop portion comprises a single loop or a double loop; and wherein the first wire end, the second wire end, and the loop portion configured from a single strand of wire; and wherein the single strand of wire comprises stainless steel.

13. The method of claim 11 wherein the first weld material and the second weld material comprise stainless steel material; wherein providing the sleeve device comprising providing a blank sleeve member, forming the first opening on a first end of the blank sleeve member and forming the first recessed region and the second recessed region of the second opening provided on a second end of the blank sleeve member such that a blocking region separates the first opening and the second opening; and forming a tapered region within an exterior portion within a vicinity of the second opening; whereupon the tapered region forms a substantially continuous imaginary surface with the pair of wires extending from the first wire end and the second wire end to reduce line catching at an interface between the sleeve device and the pair of wires of the wire structure.

14. The method of claim 11 wherein loop portion comprising an open region along a plane of the loop portion, the plane being from about 90 degrees to about 120 degrees from a length of a tubular member of a fishing rod to be attached.

15. The method of claim 1 further comprising rotating a relative position between a source of the irradiation and the one region of the sleeve to form the one region around a perimeter portion of the sleeve, the perimeter portion of the sleeve being an entire and continuous circumference of the perimeter portion of the sleeve or a portion of an entire and continuous circumference of the perimeter portion.

16. A tip top device for fishing rod comprising:
    a sleeve device comprising a first opening, the first opening configured to the tip end of the tubular member, and a second opening comprising a first recessed region and a second recessed region;
    a single strand of wire comprising a first wire end configured within the first recessed region, a second wire end configured within the second recessed region, and a loop portion configured between the first wire end and the second wire end;
    a first weld material to configure the first wire end within the first recessed region;
    a second weld material to configure the second wire end within the second recessed region;
    a substantial portion of the outer surface region of the tip top including the loop portion, the first wire end, and the second wire end being free from any weld material including the first weld material and the second weld material; and
    whereupon the tip top being is substantially ridged and mechanically attached within the first recessed region and second recessed region.

17. The device of claim 16 wherein the loop portion comprises a single loop or a double loop; wherein the single strand of wire comprises stainless steel; wherein the first weld material and the second weld material comprise stainless steel material.

18. The device of claim 16 wherein the first weld material is provided by laser irradiation; and wherein the second weld material is provided by the laser irradiation.

19. The device of claim 16 wherein the first end of the sleeve material is to be glued to a tip end of a tubular member of a fishing rod.

20. The device of claim 16 wherein loop portion comprising an open region along a plane of the loop portion, the plane being from about 90 degrees to about 120 degrees from a length of a tubular member to be attached.

* * * * *